(12) United States Patent
Pan et al.

(10) Patent No.: US 9,698,399 B2
(45) Date of Patent: Jul. 4, 2017

(54) ORGANIC-INORGANIC COMPOSITE LAYER FOR LITHIUM BATTERY AND ELECTRODE MODULE

(71) Applicant: Industrial Technology Research Institute, Hsinchu (TW)

(72) Inventors: En-Yu Pan, Kaohsiung (TW); Chun-Wei Su, New Taipei (TW); Chyi-Ming Leu, Hsinchu County (TW); Jen-Chih Lo, Changhua County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 263 days.

(21) Appl. No.: 14/493,360

(22) Filed: Sep. 23, 2014

(65) Prior Publication Data

US 2015/0162585 A1 Jun. 11, 2015

(30) Foreign Application Priority Data

Dec. 10, 2013 (TW) .............................. 102145454 A

(51) Int. Cl.
- *H01M 2/16* (2006.01)
- *C08K 3/22* (2006.01)
- *C08K 3/34* (2006.01)
- *H01M 10/052* (2010.01)

(52) U.S. Cl.
CPC .............. *H01M 2/1686* (2013.01); *C08K 3/22* (2013.01); *C08K 3/346* (2013.01); *H01M 10/052* (2013.01); *C08K 2003/2227* (2013.01); *C08K 2201/005* (2013.01); *C08K 2201/011* (2013.01)

(58) Field of Classification Search
CPC ........ H01M 2/1686; H01M 2/14; H01M 2/16; H01M 2/26; H01M 10/052; C08K 2003/2227; C08K 3/346
USPC .................................................. 429/251, 246
See application file for complete search history.

(56) References Cited

U.S. PATENT DOCUMENTS

| | | |
|---|---|---|
| 6,432,586 B1 | 8/2002 | Zhang |
| 7,189,478 B2 | 3/2007 | Iijima et al. |
| 7,419,743 B2 | 9/2008 | Fujikawa et al. |
| 2008/0038631 A1 | 2/2008 | Nakura et al. |
| 2009/0181300 A1 | 7/2009 | Kim |

(Continued)

FOREIGN PATENT DOCUMENTS

| | | |
|---|---|---|
| CN | 1187857 | 2/2005 |
| CN | 101872853 | 10/2010 |

(Continued)

OTHER PUBLICATIONS

"Office Action of Japan Counterpart Application", issued on Nov. 17, 2015, p. 1-p. 4.

(Continued)

*Primary Examiner* — Jayne Mershon
(74) *Attorney, Agent, or Firm* — Birch, Stewart, Kolasch & Birch, LLP

(57) ABSTRACT

An organic-inorganic composite layer for a lithium battery includes an organic polymer and a plurality of composite inorganic particles. The weight ratio of the organic polymer to the composite inorganic particles is 10:90 to 95:5, wherein the composite inorganic particles have at least two structural configurations stacked in staggered configuration.

13 Claims, 3 Drawing Sheets

(56) References Cited

U.S. PATENT DOCUMENTS

| | | | |
|---|---|---|---|
| 2010/0159314 A1 | 6/2010 | Kim et al. | |
| 2010/0323233 A1 | 12/2010 | Hennige et al. | |
| 2014/0248525 A1* | 9/2014 | Iwai | H01M 2/1686 429/144 |
| 2015/0295216 A1* | 10/2015 | Okuno | H01M 2/1653 320/128 |

FOREIGN PATENT DOCUMENTS

| | | | |
|---|---|---|---|
| CN | 102790195 | | 11/2012 |
| CN | 102916149 | | 2/2013 |
| CN | 103117410 | | 5/2013 |
| JP | 200184987 | | 3/2001 |
| JP | 2008-226566 | | 9/2008 |
| JP | WO 2013/058371 | * | 4/2013 |
| JP | WO 2013/108510 | * | 7/2013 |
| JP | 2013222581 | | 10/2013 |
| TW | 200933960 | | 8/2009 |
| TW | 201133991 | | 10/2011 |
| TW | 201324921 | | 6/2013 |
| TW | 201343404 | | 11/2013 |

OTHER PUBLICATIONS

"Office Action of Taiwan Counterpart Application", issued on Jan. 12, 2015, p. 1-p. 6.

Koh et al, "Preparation and Characterization of Porous PVdF-HFP/ clay Nanocomposite Membranes," Journal of Materials Science & Technology, Jul. 2010, pp. 633-638.

Deka et al., "Electrical and electrochemical studies of poly(vinylidene fluoride)—clay nanocomposite gel polymer electrolytes for Li-ion batteries," Journal of Power Sources, Feb. 1, 2011, pp. 1358-1364.

Prasanth et al., "Effect of nano-clay on ionic conductivity and electrochemical properties of poly(vinylidene fluoride) based nanocomposite porous polymer membranes and their application as polymer electrolyte in lithium ion batteries," European Polymer Journal, Feb. 2013, pp. 307-318.

Jeong et al., "Closely packed SiO2 nanoparticles/poly(vinylidene fluoride-hexafluoropropylene) layers-coated polyethylene separators for lithium-ion batteries," Journal of Power Sources, Aug. 15, 2011, pp. 6716-6722.

Nunes-Pereira et al., "Porous Membranes of Montmorillonite/ Poly(vinylidene fluoride-trifluorethylene) for Li-Ion Battery Separators," Electroanalysis, Nov. 2012, pp. 2147-2156.

* cited by examiner

ORGANIC-INORGANIC COMPOSITE LAYER FOR LITHIUM BATTERY AND ELECTRODE MODULE

CROSS-REFERENCE TO RELATED APPLICATION

This application claims the priority benefit of Taiwan application serial no. 102145454, filed on Dec. 10, 2013. The entirety of the above-mentioned patent application is hereby incorporated by reference herein and made a part of this specification.

TECHNICAL FIELD

The disclosure relates to an organic-inorganic composite layer for a lithium battery and an electrode module thereof

BACKGROUND

When internal short circuit occurs to the traditional lithium battery, since a large amount of heat is released in a short time, the separator for which the material is polyolefin in the structure is melted and deformed due to an inability of the separator to withstand high temperature. If local heat accumulation cannot be blocked or internal short circuit cannot be stopped, then the active substance of the lithium battery is decomposed and forms a high-pressure gas, and may even generate a hazard such as explosion. Accordingly, all international lithium battery manufacturing firms invest significant resources into the research on the safety issue of how to effectively alleviate internal short circuit of the lithium battery. The heat-resistance layer (HRL) developed by Panasonic can be introduced to the inside of the lithium battery, thereby strengthening the mechanical properties of the separator and thus preventing the effect of internal short circuit generated by direct contact between the positive and negative electrodes caused by heating of the battery. As a result, the safety of the battery is increased. However, the thermal barrier material is mainly composed of a high content of inorganic particles and a low content of an organic polymer binder, and thus internal resistance of the battery is readily increased. Moreover, the inorganic particles are readily peeled off when used in a charge/discharge process, and therefore the protective function thereof is lost. Moreover, since the inorganic particles are readily aggregated and subsided, processability is inconvenient. As a result, the effect of the thermal barrier material is affected.

Based on the above, currently, a new material composition is still needed to improve the impedance of the current commercial battery containing a thermal barrier layer, and to provide good processability and maintain the safety of the battery.

SUMMARY

The disclosure provides an organic-inorganic composite layer for a lithium battery. The organic-inorganic composite layer for a lithium battery includes an organic polymer and a plurality of composite inorganic particles. The weight ratio of the organic polymer to the composite inorganic particles is 10:90 to 95:5, wherein the composite inorganic particles have at least two structural configurations stacked in staggered configuration.

The disclosure provides an electrode module. The electrode module includes an anode plate, a cathode plate, a separator between the anode plate and the cathode plate, and an organic-inorganic composite layer. The organic-inorganic composite layer is located between the anode plate and the separator and/or between the cathode plate and the separator, wherein the organic-inorganic composite layer includes an organic polymer and a plurality of composite inorganic particles, the weight ratio of the organic polymer to the composite inorganic particles is 10:90 to 95:5, and the composite inorganic particles have at least two structural configurations stacked in staggered configuration.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EMBODIMENTS

Figure 1:
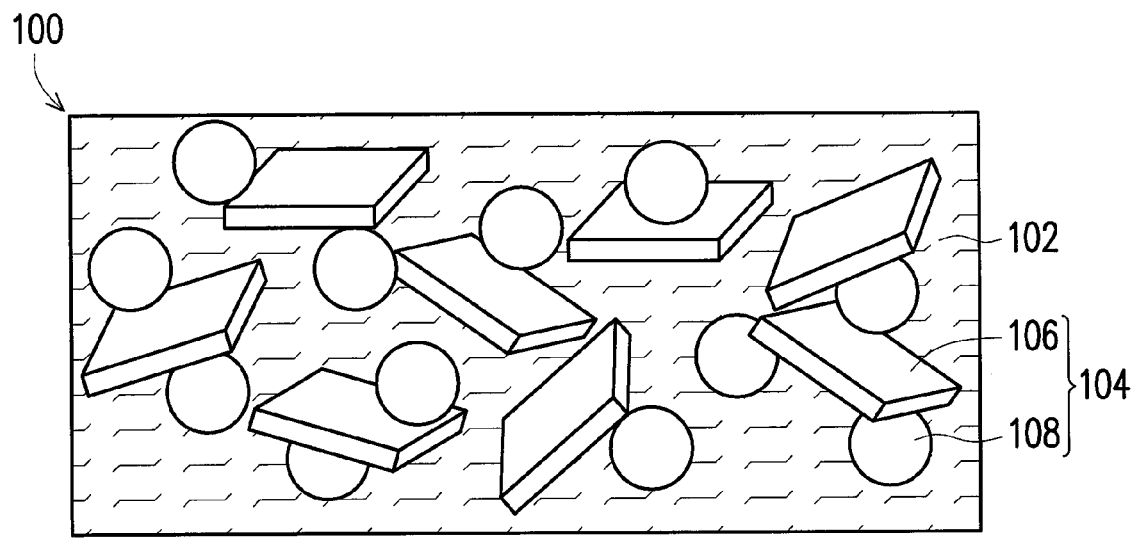
FIG. 1 is a schematic diagram of an organic-inorganic composite layer for a lithium battery according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic diagram of an organic-inorganic composite layer for a lithium battery according to an embodiment of the disclosure.

Referring to FIG. 1, an organic-inorganic composite layer 100 for a lithium battery of the present embodiment includes an organic polymer 102 and a plurality of composite inorganic particles 104, and the organic polymer 102 is, for instance, at least one polymer material selected from a fluorine-containing polyethylene polymer and a copolymer thereof, such as polyvinylidene fluoride (PVDF) or a fluoropolymer binder. The fluoropolymer binder includes, for instance, polytetrafluoroethylene (PTFE), a fluorinated ethylene propylene (FEP) copolymer, a polyperfluoroalkoxy (PFA) resin, polychlorotrifluoroethylene (PCTFE), an ethylene-chlorotrifluoroethylene (ECTFE) copolymer, an ethylene-tetrafluoroethylene (ETFE) copolymer, polyvinylidene fluoride (PVDF), polyvinyl fluoride (PVF), other fluoropolymer binders, or a combination thereof Moreover, the weight ratio of the organic polymer 102 to the composite inorganic particles 104 is 10:90 to 95:5. From the viewpoint of increasing the adhesion of the composite inorganic particles 104, the weight ratio of the organic polymer 102 to the composite inorganic particles 104 is preferably 60:40 to 80:20. In the present embodiment, regardless of the structural configuration of the composite inorganic particles 104, the particle size is between, for instance, 10 nm and 1 μm. The composite inorganic particles 104 have at least two structural configurations stacked in staggered configuration, and the structural configurations are, for instance, a spherical shape, a plate shape, a flake shape, or a rod shape. In the present embodiment, two structures are used as example, that is, the composite inorganic particles 104 are respectively first structural configuration inorganic particles 106 and second structural configuration inorganic particles 108. However, the disclosure is not limited thereto. Moreover, provided the composite inorganic particles 104 in the organic polymer 102 are stacked in staggered configuration, the weight ratio of the first to the second structural configuration inorganic particles 106 and 108 may be 10:90 to 90:10. Moreover, using FIG. 1 as example, the first structural configuration inorganic particles 106 are flake-shaped, and the material thereof may be selected from clay or other suitable materials; the second structural configuration inorganic particles 108 are sphere-shaped, the material thereof may be selected from aluminum oxide or other suitable materials, and the particle size of the second structural configuration inorganic particles 108 is, for instance, between 10 nm and 500 nm.

FIG. 2A to FIG. 2D are schematic diagrams of different electrode modules according to another embodiment of the disclosure.

Figure 2A:
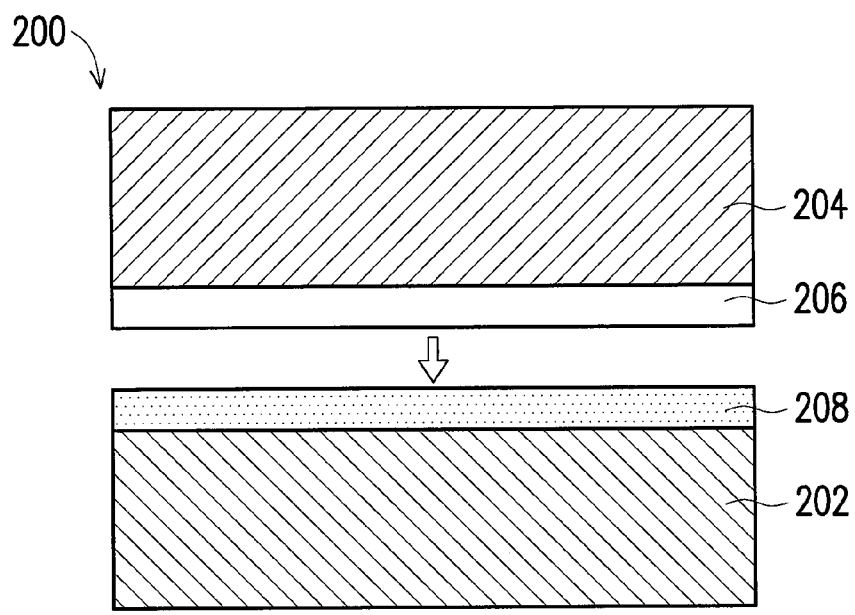
FIG. 2A to FIG. 2D are schematic diagrams of different electrode modules according to another embodiment of the disclosure.

Referring to FIG. 2A, a first electrode module 200 includes an anode plate 202, a cathode plate 204, a separator 206 between the anode plate 202 and the cathode plate 204, and an organic-inorganic composite layer 208. The organic-inorganic composite layer 208 is located between the anode plate 202 and the separator 206, and when the electrode module 200 is manufactured, the organic-inorganic composite layer 208 can first be coated on the anode plate 202, and then the separator 206 and the cathode plate 204 thereof are combined. The composition of the organic-inorganic composite layer 208 is as described for the organic-inorganic composite layer 100 of the above embodiment and is therefore not repeated herein. In this embodiment, the thickness of the organic-inorganic composite layer 208 is between 0.1 μm and 10 μm.

Figure 2B:
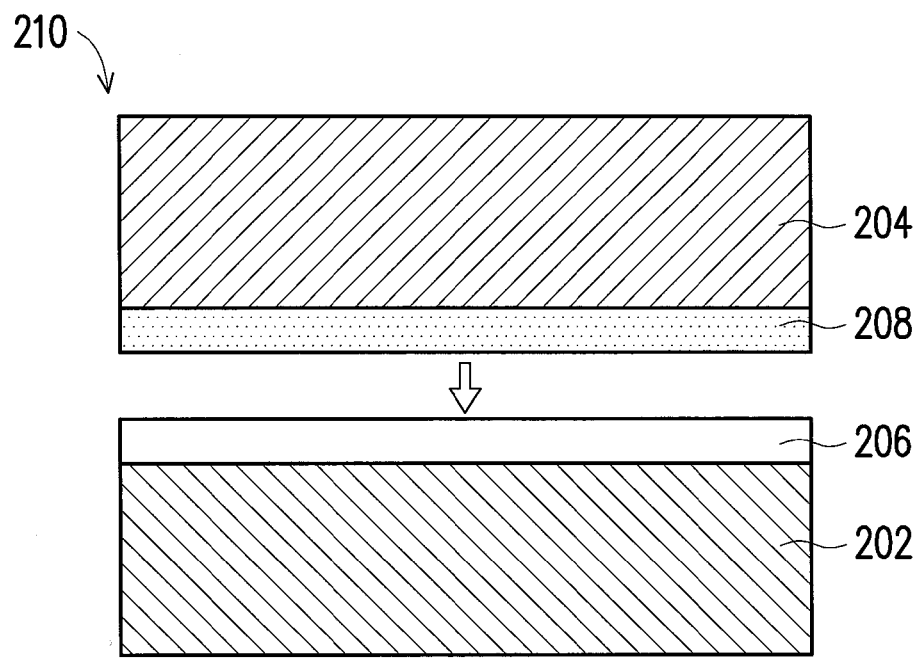

In FIG. 2B, a second electrode module 210 also has the anode plate 202, the cathode plate 204, the separator 206, and the organic-inorganic composite layer 208. However, the organic-inorganic composite layer 208 is located between the cathode plate 204 and the separator 206, and when the electrode module 210 is manufactured, the organic-inorganic composite layer 208 can first be coated on the cathode plate 204, and then the separator 206 thereof is combined with the anode plate 202.

Figure 2C:
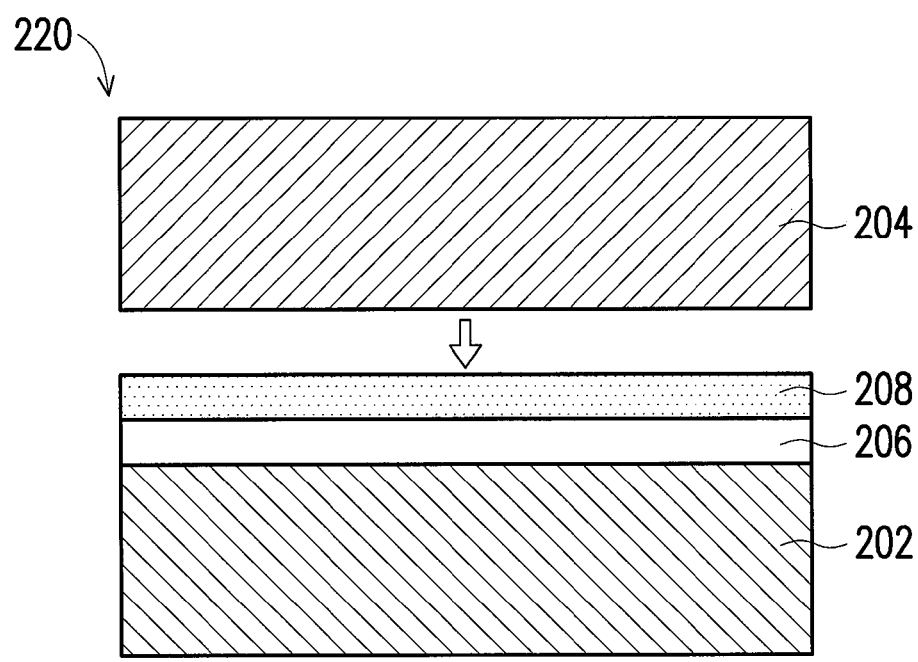

In FIG. 2C, the arrangement order of the anode plate 202, the cathode plate 204, the separator 206, and the organic-inorganic composite layer 208 in a third electrode module 220 is the same as that of the second electrode module 210. However, when the electrode module 220 is manufactured, the organic-inorganic composite layer 208 is first coated on the separator 206, and then the organic-inorganic composite layer 208 and the cathode plate 204 thereof are combined.

Figure 2D:
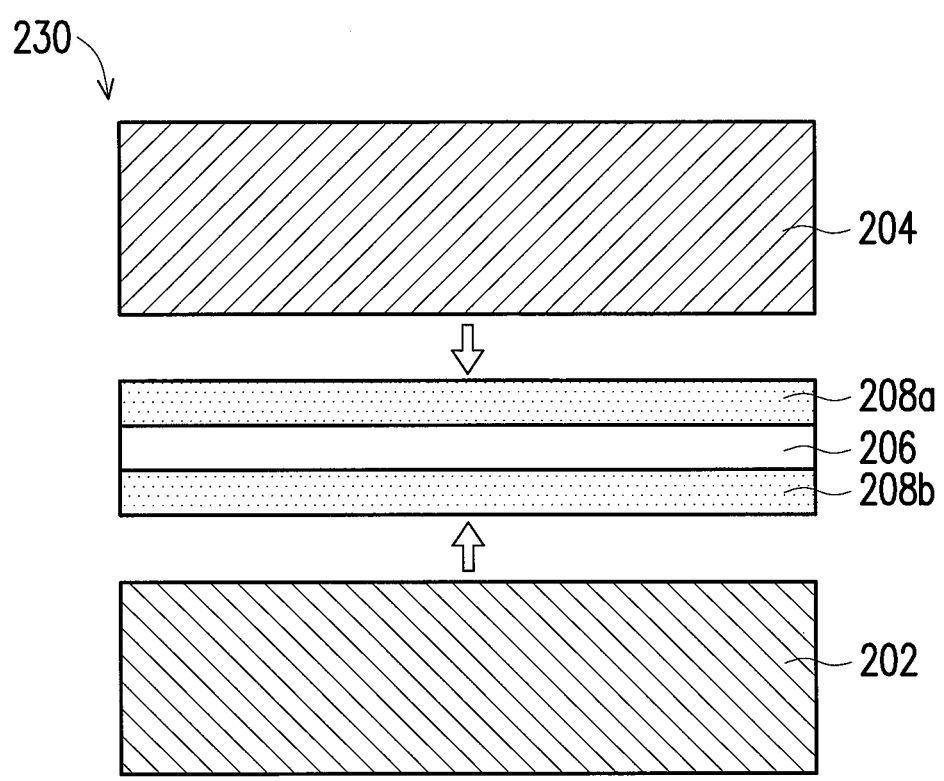

In FIG. 2D, a fourth electrode module 230 also has the anode plate 202, the cathode plate 204, and the separator 206. However, an organic-inorganic composite layer 208a is between the cathode plate 204 and the separator 206, and an organic-inorganic composite layer 208b is also between the anode plate 202 and the separator 206. Therefore, when the electrode module 230 is assembled, the organic-inorganic composite layers 208a and 208b can first be coated on two sides of the separator 206, and then the organic-inorganic composite layers 208a and 208b are combined with the anode plate 202 and the cathode plate 204. The composition of each of the organic-inorganic composite layers 208a and 208b is as described for the organic-inorganic composite layer 100 of the above embodiment and is therefore not repeated herein.

Based on the above, in the disclosure, an organic-inorganic composite layer for a lithium battery is formed by an organic polymer and composite inorganic particles having a variety of structural configurations stacked in staggered configuration. Since the composite layer has at least two structural configurations stacked in staggered configuration, a three-dimensional space can be formed thereby. As a result, not only can the dispersibility of the inorganic particles be increased, subsidence of the inorganic particles can also be reduced, thus further increasing the processability of the organic-inorganic composite layer. Moreover, such an organic-inorganic composite layer can increase the adhesion of the composite layer and the surface of the substrate by reducing the ratio of the inorganic material. When applied in the electrode module of a lithium ion battery, the lithium ions having conductive function can have sufficient space and be stacked on the surface of the inorganic particles (such as flaky clay) in large quantities, thus increasing ion transfer and reducing battery impedance, and increasing battery safety at the same time.

Several experiments are described below to prove the efficacy of the disclosure. However, the scope of the disclosure is not limited to the following experiments.

1. Preparation of Solution (1) Preparation of 200 nm lithium ion-replaced nanoclay solution: 25 g of clay (montmorillonite clay, purchased from Nanocor, dimension: 200 nm) was dispersed in 500 g of deionized water, then 0.1% lithium ions were added, and then 475 g of dimethyl acetamide (DMAc) was added. The aqueous solution was replaced and phased inverted into DMAc, and after uniform dispersion, a lithium ion-replaced nanoclay solution A having a solid content of 5% was obtained.

(2) Preparation of $Al_2O_3$ solution: 25 g of $Al_2O_3$ was dispersed in 225 g of a DMAc solvent, and then the mixture was stirred at room temperature (about 25° C.) to obtain a 10% $Al_2O_3$ solution.

(3) Preparation of PVDF solution: 120 g of PVDF (KF1300 purchased from Kureha) was dissolved in 585 g of a DMAc solvent, and then the mixture was stirred at room temperature (about 25° C.) to obtain a 17% PVDF solution.

2. Preparation of Coating Dispersion

Coating 1

100 g of lithium ion-replaced nanoclay solution A was added to 380 g of a DMAc solvent. Then, 50 g of the $Al_2O_3$ solution was further added to 137 g of the PVDF solution, and then the mixture was uniformly mixed.

Coating 2

100 g of lithium ion-replaced nanoclay solution A was added to 1238 g of a DMAc solvent. Then, 250 g of the $Al_2O_3$ solution was further added to 412 g of the PVDF solution, and then the mixture was uniformly mixed.

Comparative Coating 1

100 g of lithium ion-replaced nanoclay solution A was added to 585 g of a
DMAc solvent and 70 g of the PVDF solution, and then the mixture was uniformly mixed.

Comparative Coating 2

100 g of the $Al_2O_3$ solution was added to 667g of a DMAc solvent and 430g of the PVDF solution, and then the mixture was uniformly mixed.

Comparative Coating 3

3.86 g of a 0.1 wt % lithium salt solution (0.1 wt % $LiOH.H_2O$) was added to a DMAc solution of 100 g clay (montmorillonite clay, purchased from Southern Clay, dimension: 20 nm) stepwise. The mixture was uniformly stirred for 30 minutes to obtain a lithium ion-replaced clay solution B. Next, 70 g of the DMAc solution was added to the lithium ion-replaced clay solution B, then 56.13 g of the PVDF solution was added, and then the mixture was uniformly mixed.

3. Test of Pot Life of Coating Dispersion

Coatings 1 to 2 and comparative coatings 1 to 3 were left to stand after 1 hour of ultrasonic vibration, and changes thereof were observed. The results are shown in Table 1 below.

TABLE 1

| Dispersion | Composition ratio (wt %) | | | | Solid content (%) | Pot Life |
|---|---|---|---|---|---|---|
| | Clay (200 nm) | $Al_2O_3$ | PVDF | Clay (20 nm) | | |
| Coating 1 | 15 | 15 | 70 | | 5 | >1 month |
| Coating 2 | 5 | 25 | 70 | | 5 | >1 month |
| Comparative coating 1 | 30 | | 70 | | 5 | 3-day colloidization |
| Comparative coating 2 | | 30 | 70 | | 5 | 5-day precipitation |
| Comparative coating 3 | | | 70 | 30 | 6 | >1 week |

It can be known from Table 1 that, since the usage period of each component of the disclosure is long, the components are uniformly dispersed and do not precipitate readily, thus facilitating the processability of the organic-inorganic composite layer.

4. Battery Assembly

EXPERIMENTAL EXAMPLE 1

Coating 1 was coated on the surface of an anode plate, wherein the anode plate was MGPA (mesophase graphite negative electrode, manufacturer: China Steel Chemical Corporation). After baking at 140° C. for 10 minutes, a modified MGPA anode plate was obtained. The modified MGPA anode plate and an unmodified LNCM (lithium nickel manganese cobalt oxide positive electrode, manufacturer: Umicore) cathode plate were assembled into an aluminum foil bag thin-type battery having a dimension of 50 mm×40 mm×1.5 mm. In particular, a polyethylene separator (N9620 purchased from Asahi) was used for the separator, and the organic solvent of the electrolyte solution was ethylene carbonate (EC)/diethylene carbonate (DEC)/propylene carbonate (PC) (2:3:5), and the lithium salt was $LiPF_6$.

EXPERIMENTAL EXAMPLE 2

A battery was assembled with the same method as experimental example 1, but coating 1 was replaced by coating 2.

Comparative Example 1

A battery was assembled with the same method as experimental example 1, but coating 1 was not used, and an unmodified MGPA anode plate was used instead.

Comparative examples 2 to 3

Batteries were assembled with the same method as experimental example 1, but coating 1 was respectively replaced by comparative coatings 1 to 2.

5. Test of Battery Performance

After the thin-type battery of each of experimental examples 1 to 2 and comparative examples 1 to 3 was left to stand for 8 hours, the battery impedance of each thereof was measured by using a 1 kHz alternating current impedance meter. The thin cell was formatted by charge/discharge cycles of 0.1C/0.1C to measure its electrical properties and irreversible capacitance, as tabulated in Table 2.

TABLE 2

| | Coating dispersion | Thickness (µm) Max. | Internal resistance (Ω) | Irreversible capacity (%) | |
|---|---|---|---|---|---|
| | | | | First cycle (0.1 C/ 0.1 C) | Second cycle (0.1 C/ 0.1 C) |
| Experimental example 1 | Coating 1 | 3.7 | 1.77 | 15.8 | 1.5 |
| Experimental example 2 | Coating 2 | 2.5 | 2.85 | 15.7 | 1.3 |
| Comparative example 1 | None | None | 1.83 | 15.8 | 1.2 |
| Comparative example 2 | Comparative coating 1 | 3.1 | 1.67 | 15.9 | 1.4 |
| Comparative example 3 | Comparative coating 2 | 2 | 1.75 | 15.4 | 1.3 |

It can be known from Table 2 that, the irreversible capacity of the first charge/discharge cycle and the second charge/discharge cycle of the electrode module of each experimental example of the disclosure is not significantly changed. Moreover, even if the thickness of each coating layer coated on the electrode plates is greater, battery performance is still good.

6. Preparation of Modified PP Separator

EXPERIMENTAL EXAMPLE 3

Coating 1 was agitated in an ultrasonic bath for 1 hour, and after being left overnight, coating 1 was coated on the surface of a polypropylene separator (N9620 purchased from Asahi) by a dip coating method. After baking at 80° C. for 10 minutes, a modified PP separator was obtained.

EXPERIMENTAL EXAMPLE 4

A modified PP separator was prepared with the same method as experimental example 3, but coating 1 was replaced by coating 2.

Comparative Example 4

One unmodified PP separator was prepared.

Comparative Examples 5 to 7

Modified PP separators were prepared with the same method as experimental example 3, but coating 1 was respectively replaced by comparative coatings 1 to 3.

7. Analysis of Resistance Value of Separator

The separator of each of experimental examples 3 to 4 and comparative examples 4 to 7 was cut into a dimension of 3 cm×3 cm. The resistance value of each separator was measured with a constant-potential constant-current analyzer (Autolab), wherein the electrolyte was 1.1 M $LiClO_4$/DMAc. The experimental results are as shown in Table 3.

TABLE 3

|  | Coating dispersion | Resistance value (Ω) of PP separator |
|---|---|---|
| Experimental example 3 | Coating 1 | 9.1 to 10.6 |
| Experimental example 4 | Coating 2 | 10.7 to 13.3 |
| Comparative example 4 | None | 9.1 to 10.2 |
| Comparative example 5 | Comparative coating 1 | 36.8 to 38.9 |
| Comparative example 6 | Comparative coating 2 | 16.5 to 65.5 |
| Comparative example 7 | Comparative coating 3 | 37.2 to 97 |

It can be known from Table 3 that, in the disclosure, the resistance values of the experimental examples are all lower than those of the comparative examples. Moreover, the organic-inorganic composite layer provided in the disclosure does not block the separator after the organic-inorganic composite layer is combined with the separator, and thus can further be used as a thermal barrier. Using a lithium battery as example, intense exothermic combustion and explosion due to short circuit of the battery caused by contraction and cracking of the internal separator caused by heating of the lithium battery can be prevented, thus increasing the safety of the battery.

Based on the above, the organic-inorganic composite layer provided in the disclosure can be coated on the surface of an electrode layer or the surface of a separator as a safety functional layer, and when the internal separator of the lithium battery is contracted and cracked due to heat, the organic-inorganic composite layer can provide the effect of protection to the separator as a thermal barrier, thus preventing intense exothermic combustion and explosion due to short circuit of the battery.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An organic-inorganic composite layer for a lithium battery, comprising:
    an organic polymer and a plurality of composite inorganic particles, and a weight ratio of the organic polymer to the composite inorganic particles is 60:40 to 80:20, wherein
    the composite inorganic particles are a mixture of a plurality of first structural configuration inorganic particles and a plurality of second structural configuration inorganic particles,
    the first structural configuration inorganic particles are plate-shaped, flake-shaped, or rod-shaped,
    the second structural configuration inorganic particles are sphere-shaped, and
    a weight ratio of the first structural configuration inorganic particles to the second structural configuration inorganic particles is 10:90 to 90:10.

2. The organic-inorganic composite layer for a lithium battery of claim 1, wherein a material of the first structural configuration inorganic particle is clay and a material of the second structural configuration inorganic particle is aluminum oxide.

3. The organic-inorganic composite layer for a lithium battery of claim 2, wherein a particle size of the second structural configuration inorganic particles is 10 nm to 500 nm.

4. The organic-inorganic composite layer for a lithium battery of claim 1, wherein a particle size of the composite inorganic particles is 10 nm to 1 μm.

5. The organic-inorganic composite layer for a lithium battery of claim 1, wherein the organic polymer is at least one polymer material selected from a fluorine-containing polyethylene polymer and a copolymer thereof.

6. The organic-inorganic composite layer for a lithium battery of claim 1, wherein the organic polymer is polyvinylidene fluoride (PVDF) or a fluoropolymer binder.

7. An electrode module, comprising:
    an anode plate;
    a cathode plate;
    a separator between the anode plate and the cathode plate; and
    an organic-inorganic composite layer located between the anode plate and the separator and/or between the cathode plate and the separator, wherein the organic-inorganic composite layer comprises an organic polymer and a plurality of composite inorganic particles, a weight ratio of the organic polymer to the composite inorganic particles is 60:40 to 80:20, and the composite inorganic particles are a mixture of a plurality of first structural configuration inorganic particles and a plurality of second structural configuration inorganic particles, the first structural configuration inorganic particles are plate-shaped, flake-shaped, or rod-shaped, the second structural configuration inorganic particles are sphere-shaped, and a weight ratio of the first structural configuration inorganic particles to the second structural configuration inorganic particles is 10:90 to 90:10.

8. The electrode module of claim 7, wherein a material of the first structural configuration inorganic particle is clay and a material of the second structural configuration inorganic particle is aluminum oxide.

9. The electrode module of claim 8, wherein a particle size of the second structural configuration inorganic particle is 10 nm to 500 nm.

10. The electrode module of claim 7, wherein a particle size of the composite inorganic particles is 10 nm to 1 μm.

11. The electrode module of claim 7, wherein the organic polymer is at least one polymer material selected from a fluorine-containing polyethylene polymer and a copolymer thereof.

12. The electrode module of claim 7, wherein the organic polymer is PVDF or a fluoropolymer binder.

13. The electrode module of claim 7, wherein a thickness of the organic-inorganic composite layer is between 0.1 μm and 10 μm.

* * * * *